H. TRACHSLER.
CEMENT FURNACE.
APPLICATION FILED MAY 23, 1910.
1,042,727.
Patented Oct. 29, 1912.
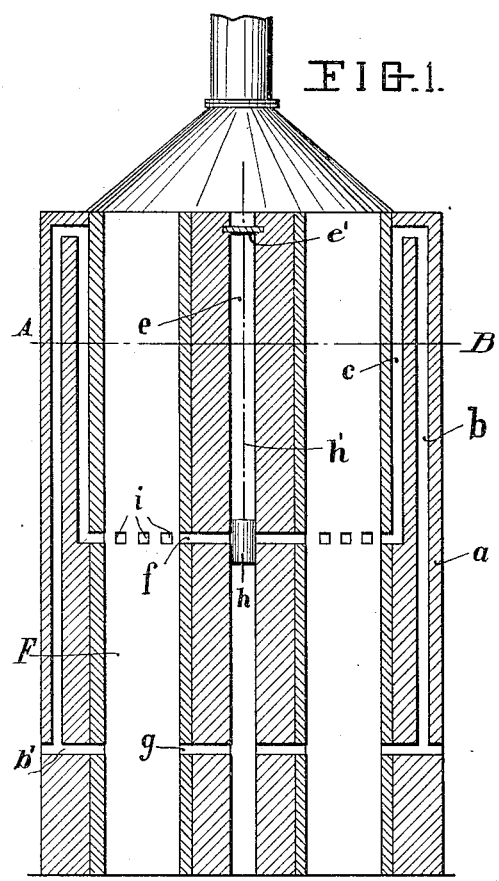
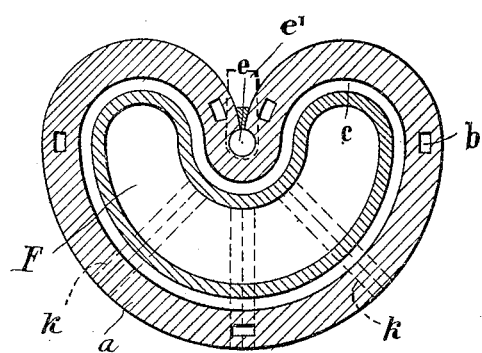
INVENTOR,
Heinrich Trachsler,
by B. Singer,
Att'y.
Witnesses,
M. Hefling
D. Burdine

UNITED STATES PATENT OFFICE.

HEINRICH TRACHSLER, OF ZÜRICH, SWITZERLAND.

CEMENT-FURNACE.

1,042,727.  Specification of Letters Patent. Patented Oct. 29, 1912.

Application filed May 23, 1910. Serial No. 562,918.

*To all whom it may concern:*

Be it known that I, HEINRICH TRACHSLER, a citizen of the Republic of Switzerland, residing at Zürich, V Muhlebachstrasse 38, Switzerland, have invented certain new and useful Improvements in Cement-Furnaces, of which the following is a specification.

The present invention relates to a cement furnace particularly suitable for treating large charges of material, and is particularly intended to be heated by coal and coke in such a manner that the fuel is mixed with the raw powdered material. The increasing of the cross section of shafts of cement furnaces, when it is desired to treat a large quantity of material and in firing, is attended with certain difficulties. The material being burnt has a tendency to cake, and when the burning chamber is too wide it is almost impossible to loosen the caked mass; the difficulty of supplying sufficient air to the interior of the charge is another disadvantage.

According to the present invention, I avoid the use of shafts which are too wide, but obtain a sufficient supply of air to the interior and all parts of the charge by providing a special air supply shaft. A half-circular or arc shaped furnace is used, while the air supply shaft is situated at the side of the furnace, and the cross section of the furnace pit is substantially half annular or arc shaped, the distance between the walls of the shaft being equally short everywhere.

The particular feature of the furnace constituting the present invention consists of the special arrangement whereby the heated air may be distributed. This distribution of the heated air is effected at two absolutely different zones of the furnace, namely, the clinker zone and the calcining zone; thus two different hearths are formed in the furnace.

I shall now particularly describe my invention, with reference to the accompanying drawings, in which:—

Figure 1 is a vertical section of a furnace embodying my invention; Fig. 2 is a horizontal section taken on the line A—B of Fig. 1.

According to the structure as disclosed in the drawing, the furnace pit F is of an arc shape, and is provided by the formation of a jacketing wall consisting of brick work. Air supply channels $b$ are formed in this wall, and communicate at points near the bottom of the furnace pit with the atmosphere by means of passages $b'$, which passages $b'$ pass entirely across the wall of the furnace so as to communicate with the pit F, as shown in the drawings. The channels $b$ connect at their upper ends with a chamber $c$ situated in the wall of the furnace, the arrangement of which can be particularly seen upon reference to Fig. 2. The chamber $c$ communicates with the furnace pit by means of channels $i$ at approximately the clinker zone of the furnace. A vertical air channel $e$ is situated approximately concentric to the arc shaped pit F and is disposed in the jacketing wall $a$. The channel $e$ can be closed by a slide valve $e'$, which may be conveniently controlled directly from the exterior of the furnace; the channel $e$ communicates with cross channels $f$ and $g$ which pass radially through wall $a$, so that air may be fed in two directions from channel $e$; channel $f$ is situated about opposite channels $i$, hereinbefore referred to, and channel $g$ is situated approximately opposite channels $b'$, but they must be so disposed that the channel $f$ has its outlet into the calcining zone of the furnace and the channel $g$ has its outlet into the clinker zone.

A slide valve $h$ is movably arranged in the channel $e$ for regulating the passage of air, suitable means $h'$ being provided for adjusting the valve from outside the furnace. The channel $e$ communicates at the base of the furnace with horizontally disposed passages $k$, through which air may be driven by means of a suitable blast, but the furnace may be worked without a blast, the ordinary natural draft being utilized. The air entering the furnace shaft from channel $g$ affords the complete combustion of the coal mixed with the cement material. The zone of greatest heat exists somewhat above the channels $g$, and in this zone the actual clinkering takes place. The carbon dioxid formed there from the fuel, and the same gas set free from the raw cement material in the region of channel $f$ is converted, by means of the well-known reaction with incandescent carbon, into carbon monoxid. In the usual construction of cement furnaces, the carbon monoxid generated is lost, as it is allowed to escape unburnt together with the other gases. By the arrangement constituting the present invention, however, hot air is introduced throughout the whole cross section of this zone through the passages $f$ and $i$; this air mixing with the carbon monoxid causes the combustion of the latter, the heating effect thereof being utilized in the calcining process.

The above described operations require a reliable regulation of the supply of air to the interior of the furnace, and by moving the slide valve $h$, and also regulating the position of valve $e'$, the amount of air passing through the channel $e$ can be regulated.

In the form of construction shown, the air shaft $e$ being arranged near the outer walls of the furnace, enables the regulation of the air supply to be easily effected from the exterior of the furnace. The layer of material to be burnt is of the same thickness throughout, and is such that air can penetrate in sufficient quantity even to the middle of the layer. The air channel $e$ is easily accessible so that the quantity of air introduced into the inner chamber can easily be regulated from the outside.

I claim:—

1. A cement furnace comprising in combination, a jacketing wall forming a furnace pit of arc shaped transverse section and having a longitudinally extending air channel formed therein substantially concentric to the said pit and adapted to deliver air radially thereinto.

2. A cement furnace comprising in combination, a jacketing wall forming a furnace pit of arc shaped transverse section and having a longitudinally extending air channel formed therein substantially concentric to the said pit and adapted to deliver air radially thereinto, and means actionable from the exterior side of said jacketing wall and passing transversely therethrough adjacent the air channel for controlling the same.

3. A cement furnace comprising in combination, a jacketing wall forming a furnace pit of arc shaped transverse section, said jacketing wall having an air chamber formed therein surrounding said pit above and open to the calcining zone of the furnace pit, said chamber receiving air adjacent its upper end, and a longitudinally extending air channel formed substantially concentric to the said pit and adapted to deliver air radially thereinto.

In testimony whereof I affix my signature in presence of two witnesses.

HEINRICH TRACHSLER.

Witnesses:
T. F. DWIGHT,
CHARLES ORTLIEB.

---

Copies of this patent may be obtained for five cents each, by addressing the "Commissioner of Patents, Washington, D. C."